(12) United States Patent
D'oleo

(10) Patent No.: US 11,188,721 B2
(45) Date of Patent: Nov. 30, 2021

(54) HEADPHONES FOR A REAL TIME NATURAL LANGUAGE MACHINE INTERPRETATION

(71) Applicant: Andi D'oleo, Canoga Park, CA (US)

(72) Inventor: Andi D'oleo, Canoga Park, CA (US)

( * ) Notice: Subject to any disclaimer, the term of this patent is extended or adjusted under 35 U.S.C. 154(b) by 156 days.

(21) Appl. No.: 16/659,799

(22) Filed: Oct. 22, 2019

(65) Prior Publication Data

US 2020/0125646 A1 Apr. 23, 2020

Related U.S. Application Data

(60) Provisional application No. 62/748,763, filed on Oct. 22, 2018.

(51) Int. Cl.
*G06F 40/58* (2020.01)
*H04R 1/10* (2006.01)
(Continued)

(52) U.S. Cl.
CPC ............. *G06F 40/58* (2020.01); *G10L 13/00* (2013.01); *G10L 15/22* (2013.01); *G10L 15/26* (2013.01);
(Continued)

(58) Field of Classification Search
CPC ......... A61B 5/318; G06F 3/162; G06F 3/167; G06F 40/58; G06F 40/263; G06K 9/00604; G09B 5/04; G10L 13/00; G10L 15/005; G10L 15/22; G10L 15/26; G10L 15/30; G10L 25/93; G10L 25/48; H04H 20/61; H04R 1/1008; H04R 1/1041; H04R 2420/07; G06Q 10/0631

USPC .......... 348/14.01; 379/387.01; 381/71.1, 74, 381/315, 17, 71.6; 455/11.1; 704/2, 3, 4, 704/226, 246, 275
See application file for complete search history.

(56) References Cited

U.S. PATENT DOCUMENTS 3,862,379 A * 1/1975 Pless .................... H04R 1/1041
381/74
8,379,072 B2 * 2/2013 von Hybschmann ... G06F 40/58
348/14.01
(Continued)

*Primary Examiner* — Gerald Gauthier
(74) *Attorney, Agent, or Firm* — Lyman Moulton, Esq.; Moulton Patents, PLLC

(57) ABSTRACT

A method and a system are disclosed for generating a voiced machine interpretation in a second language for theatre and movie entertainment. The method includes generating a machine translation from English into a second language and generating a machine interpretation from the machine translation into the second language. The method additionally includes broadcasting the machine interpretation to a channel for pickup by a user and storing the machine translation and the machine interpretation for subsequent use on multiple channels. The disclosure also includes performing the above steps in real time and in batch mode. The system includes a machine language translation (MT) module, a machine language interpretation (MI), broadcast transceivers, wireless stereophonic headphones, digital microprocessor(s), a second language dialer, MT and MI memory storage, an administrative module, a bypass module for human translation or human interpretation, a real time processing module, and a batch mode processing module.

18 Claims, 3 Drawing Sheets

(51) Int. Cl.
*G10L 15/22* (2006.01)
*G10L 13/00* (2006.01)
*G10L 15/26* (2006.01)

(52) U.S. Cl.
CPC ......... *H04R 1/1008* (2013.01); *H04R 1/1041* (2013.01); *H04R 2420/07* (2013.01)

(56) References Cited

U.S. PATENT DOCUMENTS

| | | | |
|---|---|---|---|
| 9,747,282 B1* | 8/2017 | Baker | G10L 15/26 |
| 10,311,887 B2* | 6/2019 | Goldstein | G06F 16/60 |
| 10,334,349 B1* | 6/2019 | Crowder | G06F 3/165 |
| 10,417,349 B2* | 9/2019 | Lewis | G06F 40/58 |
| 2005/0058313 A1* | 3/2005 | Victorian | H04R 25/558 381/315 |
| 2005/0129250 A1* | 6/2005 | Aubauer | H04M 1/271 381/17 |
| 2006/0126821 A1* | 6/2006 | Sahashi | H04M 3/56 379/387.01 |
| 2008/0195390 A1* | 8/2008 | Almagro | H04M 1/19 704/246 |
| 2010/0135504 A1* | 6/2010 | Almagro | H04R 1/083 381/71.1 |
| 2010/0169073 A1* | 7/2010 | Almagro | G06F 40/58 704/3 |
| 2010/0185432 A1* | 7/2010 | Almagro | H04R 5/033 704/2 |
| 2010/0235161 A1* | 9/2010 | Kim | G10L 15/26 704/3 |
| 2010/0250231 A1* | 9/2010 | Almagro | G06F 40/58 704/2 |
| 2011/0038484 A1* | 2/2011 | Macours | H04R 5/04 381/17 |
| 2011/0150233 A1* | 6/2011 | Gautama | G10K 11/17879 381/71.6 |
| 2011/0238405 A1* | 9/2011 | Pedre | G06F 40/58 704/3 |
| 2011/0270601 A1* | 11/2011 | Karapetian | G06F 40/58 704/4 |
| 2012/0029912 A1* | 2/2012 | Almagro | G10K 11/17873 704/226 |
| 2012/0209588 A1* | 8/2012 | Wu | G06F 40/42 704/3 |
| 2012/0330645 A1* | 12/2012 | Belisle | H04M 1/6066 704/3 |
| 2013/0173246 A1* | 7/2013 | Leung | G06F 40/58 704/2 |
| 2013/0289971 A1* | 10/2013 | Parkinson | G06F 40/58 704/2 |
| 2014/0080407 A1* | 3/2014 | Jang | H04M 1/0202 455/11.1 |
| 2016/0110349 A1* | 4/2016 | Norman-Rosedam | G06F 40/58 704/3 |
| 2017/0039866 A1* | 2/2017 | Coffee | G09B 5/04 |
| 2017/0046337 A1* | 2/2017 | Cordell | G06Q 10/0631 |
| 2017/0295229 A1* | 10/2017 | Shams | G09B 21/008 |
| 2018/0182375 A1* | 6/2018 | Fomin | G06F 40/58 |
| 2018/0246882 A1* | 8/2018 | Pazhoor | G06F 40/58 |
| 2018/0260388 A1* | 9/2018 | Huang | G06F 40/58 |
| 2018/0293230 A1* | 10/2018 | Tu | G10L 15/22 |
| 2018/0322116 A1* | 11/2018 | Huang | G06F 3/04883 |
| 2018/0322875 A1* | 11/2018 | Adachi | G06F 40/51 |
| 2019/0042565 A1* | 2/2019 | Choi | G10L 25/69 |
| 2019/0208324 A1* | 7/2019 | Shmukler | H04M 1/72412 |
| 2019/0251176 A1* | 8/2019 | Cheng | G06F 3/167 |
| 2019/0380597 A1* | 12/2019 | Howard | H04R 1/1016 |
| 2020/0125646 A1* | 4/2020 | D'oleo | G06F 40/58 |

* cited by examiner

HEADPHONES FOR A REAL TIME NATURAL LANGUAGE MACHINE INTERPRETATION

CROSS REFERENCE

The present non-provisional patent application claims reference to provisional patent application U.S. 62/748,763 Oct. 22, 2018 titled 'Headphones For A Real Time Natural Language Machine Interpretation,' by Andi D'Oleo which is incorporated by reference in its entirety into the present non-provisional patent application.

BACKGROUND

Conventionally available multilingual machine translation services are designed to translate text. Some services offer a website interface, mobile apps for Android and iOS, and an API that helps developers build browser extensions and software applications. Some services support over 100 languages at various levels and some over 500 million people daily.

Other services offer a statistical machine translation and use United Nations and European Parliament transcripts to gather linguistic data. Rather than translating languages directly, such services first translate text to English and then to the target language. During a translation, the service looks for patterns in millions of documents to help decide on the best translation. Accuracy of such services have been criticized and even ridiculed on several occasions.

Services in development and public beta use involve a neural machine translation engine which translates "whole sentences at a time, rather than just piece by piece. These services use a broader context to help figure out the most relevant translation, which is then rearranged and adjusted to be more like a human speaking with proper grammar". Originally only enabled for a few languages, such services are gradually being used for more languages.

However, there exists an immediate need for a real time spoken natural language interpretation service for people of many different languages for entertainment as well as for education and personal use.

SUMMARY OF THE INVENTION

Also known as One-Voice, the disclosure is a device, such as a headphone set, which allows people from different backgrounds and different languages to be able to go to the movie theatre and still have the same experience despite not knowing English. The disclosed device translates the movie into whatever language they speak. All the user has to do is select the language by flipping channels on the headphone set.

The disclosure achieves a virtual natural language interpretation by first using a machine translation and by enunciating the translation by a computer algorithm operating at billionths of a second as disclosed herein. It is therefore first necessary to run a movie first through the translator before an interpretation may be done. English is the language of origin and translation from English to other languages is adequately supported outside the scope of this disclosure.

The headphone set at present communicates with a central processor which has the computing capability to first make a machine language translation and then to make a machine language voiced interpretation based on the machine language translation. The interpretation is broadcast on a channel for pickup by a dialer at the headset of a user. In other embodiments, only a language requested by a user will be interpreted from the machine language translation. Both the translation and the interpretation happen simultaneously from the user's point of view because of the inherent power of processors in today's market.

The central processor is able to run multiple threads of interpretation simultaneously to enable users of many different languages to be serviced and hear the same movie in their own tongue.

Figure 1:
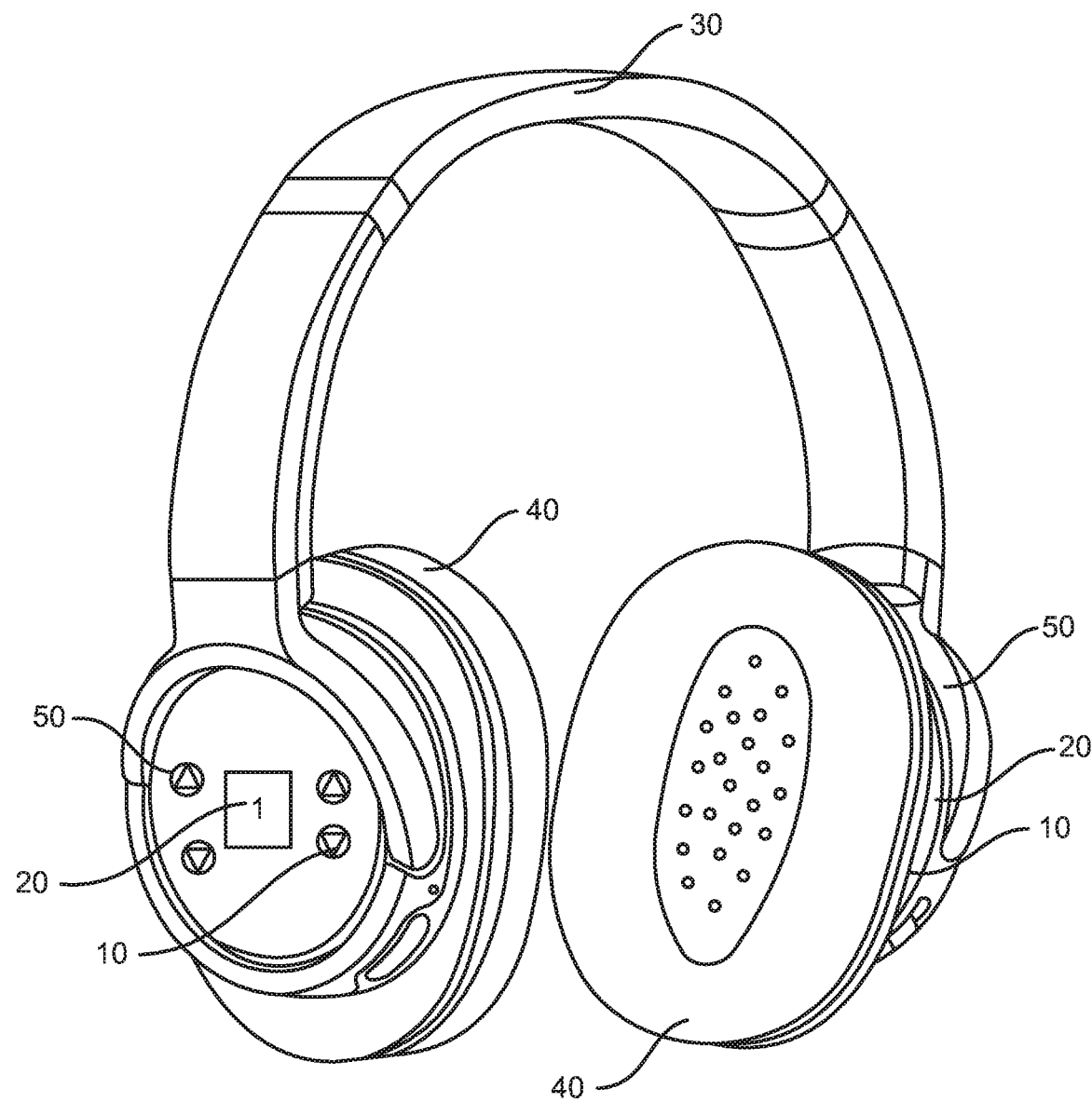
FIG. 1 is a perspective depiction of the disclosed headphones in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Throughout the present disclosure the term 'machine translation' is applied in the common sense to a translation done by a digital computer or workstation processor. The term 'translation' refers to a voiced or electronical sound production of either a computer translation or a human interpretation.

Also known as One-Voice, the disclosure is a device, such as a headphone set, which allows people from different backgrounds and different languages to be able to go to the movie theatre and still have the same experience despite not knowing English. The disclosed device translates the movie into whatever language they speak. All the user has to do is select the language by flipping channels on the headphone set.

The main purpose of OneVoice headphones is to enable moviegoers to listen to any movie in the language of their choice, regardless of the language in which the movie was actually produced. In every major United States city there are many thousands of recent immigrants from other countries, and many of these people as slow to master the English language. These people tend to go to the movies, just like everyone else, but they often find it impossible to enjoy the experience due to the language barrier.

OneVoice stereophonic headphones contain a language translation module that automatically converts the language in which a movie was produced into the language selected by the moviegoer. The translation module might be loaded with sub-modules for several of the most commonly spoken foreign languages in any given city. OneVoice headphones will be equipped with a volume control and with a channel monitor switch that the moviegoer can use to select the language of their choice, and the earpieces will be designed to block out the sound of the movie track being broadcast through the movie theater's speakers.

Thus the moviegoer can experience a movie in the language of their choice without having to listen to the English language soundtrack at the same time. OneVoice has the potential to transform the movie-going experience for thousands of people, both here in the United States and in other countries around the world, making it possible that it will be readily available from movie theatres, electronic stores and through online retailers.

FIG. 1 is a perspective depiction of the disclosed headphones in accordance with an embodiment of the present disclosure. The depiction includes a first set of changing buttons 10, channel monitor to select a language 20, rubber adjustable strap 30 and ear forms 40, and a second set of changing buttons 50 all on both the left and the right ear pieces. The ear forms are engineered to keep ears comfortable and to block out broadcast soundtrack but not the movie music nor sound effects noise via a selectable language canceling algorithm. The dual ear piece headset enables a bilingual mode of a user listening to one language in one ear and another language in the other ear.

The disclosure achieves a virtual natural language interpretation by first using a machine translation and by enunciating and interpreting the translation by a computer algorithm operating at billionths of a second as disclosed herein. It is therefore necessary to run a movie through the translator before an interpretation may be done. English is the language of origin and translation from English to other languages is adequately supported outside the scope of this disclosure.

The headphone set at present communicates with a central processor which has the computing capability to first make a machine language translation and then to make a machine language voiced interpretation based on the machine language translation. The interpretation is broadcast on a channel for pickup by a dialer at the headset of a user. In other embodiments, only a language requested by a user will be interpreted from the machine language translation. Both the translation and the interpretation happen simultaneously from the user's point of view because of the inherent power of processors in today's market.

The central processor is able to run multiple threads of interpretation simultaneously to enable users of many different languages to be serviced and hear the same movie in their own respective tongue and even bilingually through separate ears if desired through controls for each ear in the disclosed headphones as disclosed.

Figure 2:
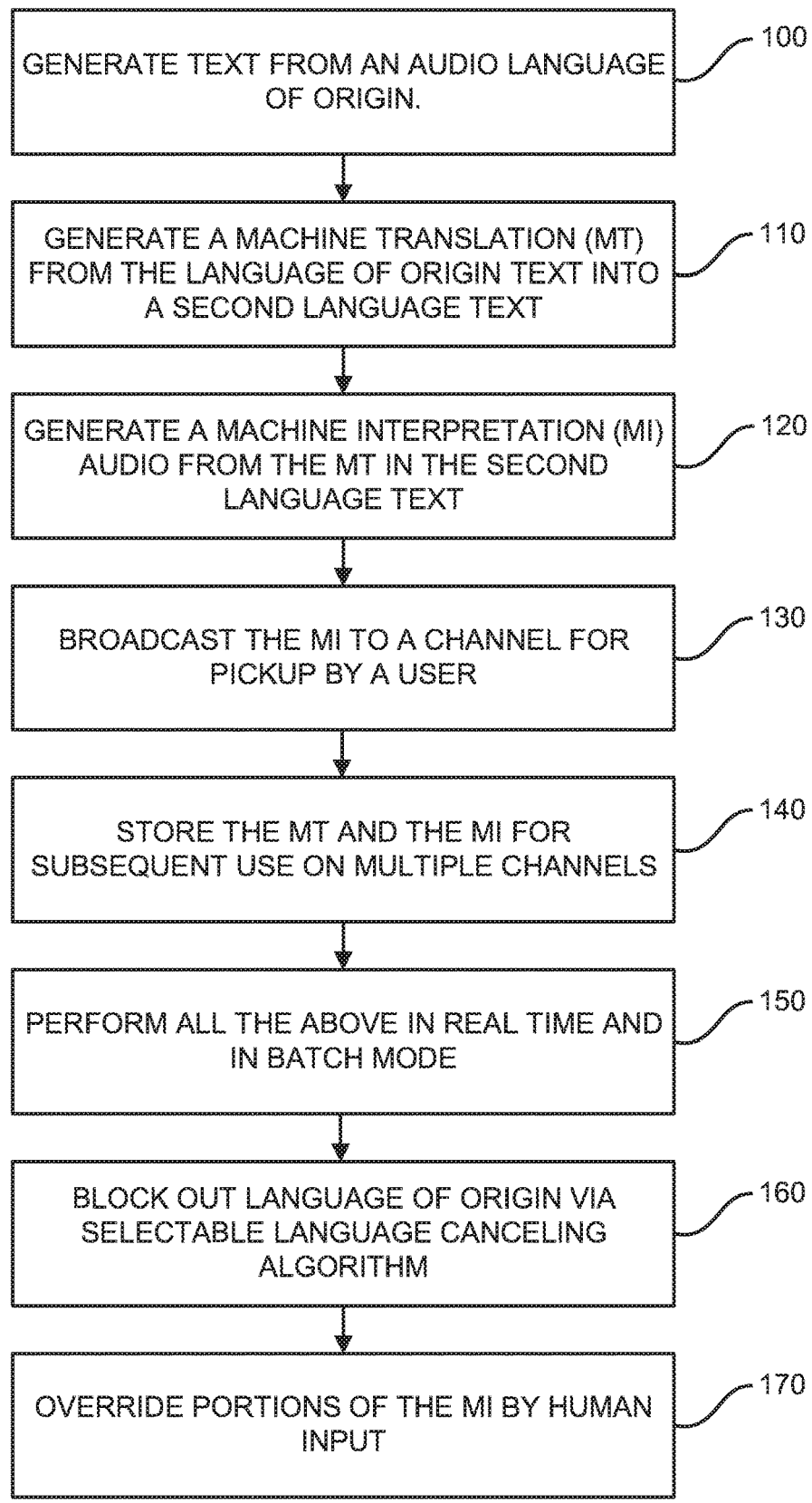
FIG. 2 is a method for generating a voiced machine interpretation in a second language in accordance with an embodiment of the present disclosure.

FIG. 2 is a method for generating a voiced machine interpretation in a second language in accordance with an embodiment of the present disclosure. The method includes generating 100 text from an audio language of origin. The method includes generating 110 too a machine translation from English into a second language. The method also includes generating 120 a machine interpretation from the machine translation into the second language. The method additionally includes broadcasting 130 the machine interpretation to a channel for pickup by a user. The method further includes storing 140 the machine translation and the machine interpretation for subsequent use on multiple channels. The method yet includes performing 150 the above steps in real time and in batch mode. The method even includes blocking 160 a language of origin via a selectable language canceling algorithm. The method allows for overriding 170 portions of the MI by human interpretation input.

Figure 3:
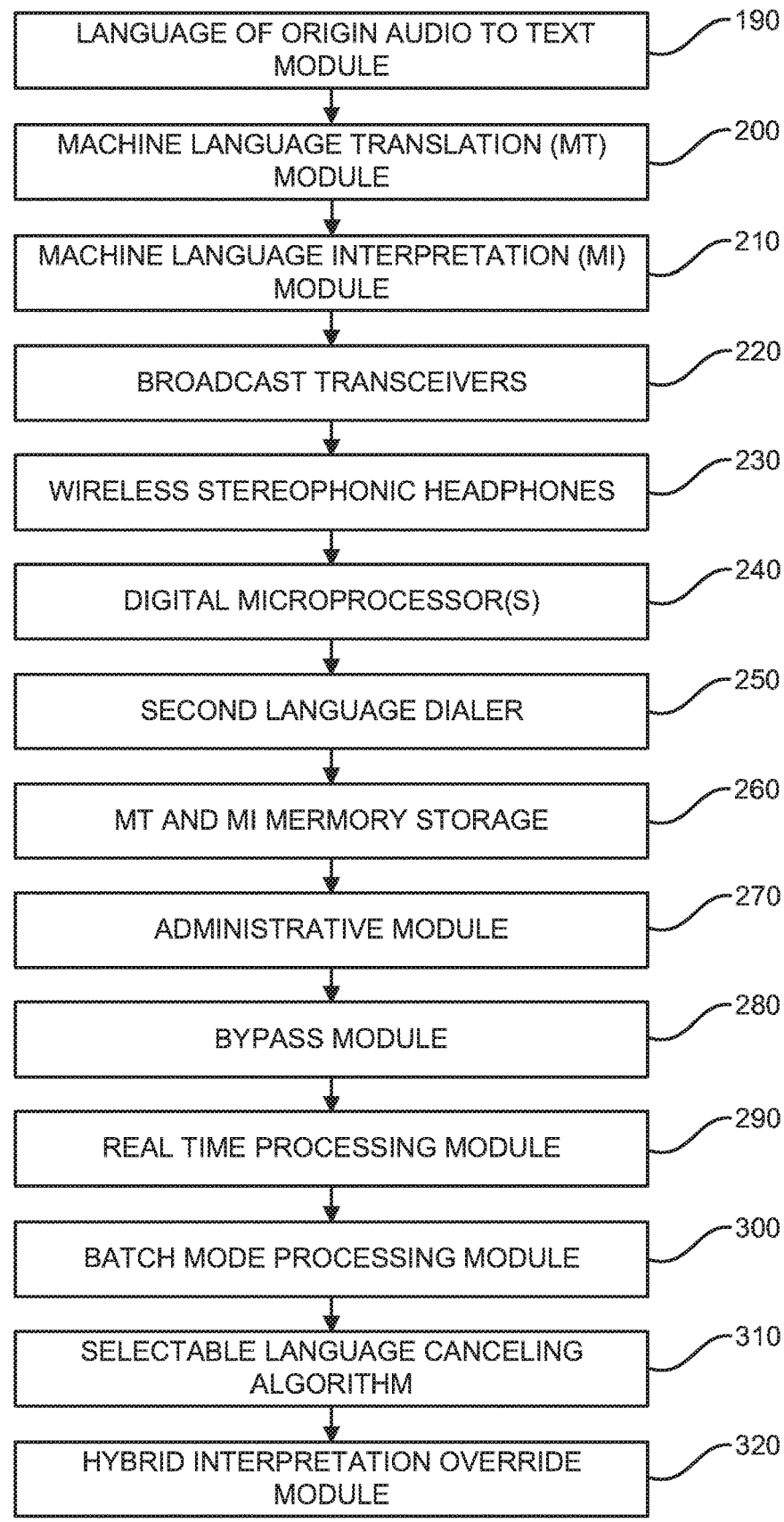
FIG. 3 is a system for generating a voiced machine interpretation in a second language in accordance with an embodiment of the present disclosure.

FIG. 3 is a system for generating a voiced machine interpretation in a second language in accordance with an embodiment of the present disclosure. The disclosed system includes a language of origin audio to text generation module 190, a machine language translation (MT) module 200, a machine language interpretation (MI) module 210, broadcast transceivers 220, wireless stereophonic headphones 230, digital microprocessor(s) 240, a second language dialer 250, MT and MI memory storage 260, an administrative module 270, a bypass module 280 for human translation or human interpretation, a real time processing module 290, and a batch mode processing module 300 and a selectable language canceling algorithm module 310 and a hybrid interpretation override module 320.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein in a non-provisional specification to follow.

What is claimed is:

1. Wireless Headphones, comprising:
   at least one wireless earpiece (EP) comprising head ergonomics and the least one earpiece comprising a plurality of digital signal processing modules including;
   a language of origin text generation (OT) module configured to generate text from an audio language of origin;
   a machine language translation (MT) module configured to translate the language of origin text into a second language text;
   a machine language interpretation (MI) module configured to generate an audio second language from the second language text; and
   a bypass (BP) module configured to enable a human translation and a human interpretation multiplexed into portions of the MT module second language text and the MI module audio second language respectively.

2. The headphones of claim 1, further comprising a selectable language canceling (LC) algorithm module engineered to block out a language of origin broadcast in audible range of the headphones.

3. The headphones of claim 1, further comprising a plurality of broadcast transceivers.

4. The headphones of claim 1, further comprising a plurality of change buttons on each earpiece, the buttons configured to enable a user to select a language to hear in a respective earpiece and a volume thereof.

5. The headphones of claim 1, further comprising a memory storage (MS) for an output of the MT module and for the MI module.

6. The headphones of claim 1, further comprising an administrative (AM) module configured to control the headphones based on input from a user.

7. The headphones of claim 1, wherein the MT and the MI modules are configured to process in real time and in batch mode.

8. The headphones of claim 1, further comprising a hybrid (HI) interpretation module comprising human interpretation override for portions of the MI module output.

9. A wireless Headphones System, comprising:
- at least one wireless earpiece (EP) comprising head ergonomics and the least one earpiece comprising a plurality of digital signal processing modules including;
- a language of origin text generation (OT) module configured to generate text from an audio language of origin;
- a machine language translation (MT) module configured to translate the language of origin text into a second language text;
- a machine language interpretation (MI) module configured to generate an audio second language from the second language text;
- a selectable language canceling algorithm (LC) module engineered to block out a language of origin broadcast in audible range; and
- a bypass (BP) module configured to enable a human translation and a human interpretation multiplexed into portion of the MT module second language text and the MI module audio second language respectively.

10. A wireless headphone method comprising:
- providing at least one wireless earpiece (EP) comprising head ergonomics and the least one earpiece comprising a plurality of digital signal processing modules including;
- generating text from an audio language of origin via a language of origin text generation (OT) module;
- translating the language of origin text into a second language text via a machine language translation (MT) module;
- generating a second language audio interpretation from the second language text via a machine language interpretation (MI) module; and
- multiplexing a human translation and a human interpretation into portions of the MT module second language text and the MI module audio second language respectively via a bypass module (BP).

11. The method of claim 10, further comprising blocking out a language of origin broadcast in audible range via an engineered selectable language canceling (LC) algorithm module.

12. The method of claim 10, further comprising listening to a first language audio interpretation in one ear and a second language audio interpretation in the other ear.

13. The method of claim 10, further comprising storing in an electronic memory storage (MS) an output of the MT module and the MI module.

14. The method of claim 10, further comprising storing in an electronic memory storage (MS) an output of the OT and HI modules.

15. The method of claim 10, further comprising an administrative module (AM) configured to control the headphones based on input from a user.

16. The method of claim 10, further comprising a peer-to-peer electronic broadcasting from one set of headphones to and from another proximal set of headphones.

17. The method of claim 10, further comprising a central electronic memory storage from a central memory processor to and from a plurality of headphones.

18. The method of claim 10, further comprising a peer-to-peer electronic memory storage from one set of headphones to and from another proximal set of headphones.

* * * * *